(12) United States Patent
Hass

(10) Patent No.: US 8,511,255 B2
(45) Date of Patent: *Aug. 20, 2013

(54) THERAPEUTICALLY ENHANCED PET TOY

(75) Inventors: Peter M. Hass, Orinda, CA (US); Eden G. Hass, legal representative, Orinda, CA (US)

(73) Assignee: Petsport USA, Inc., Pittsburg, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 13/050,912

(22) Filed: Mar. 17, 2011

(65) Prior Publication Data

US 2011/0162587 A1    Jul. 7, 2011

Related U.S. Application Data

(63) Continuation-in-part of application No. 12/118,174, filed on May 9, 2008, now Pat. No. 7,946,251.

(51) Int. Cl.
*A01K 29/00*    (2006.01)

(52) U.S. Cl.
USPC ........................................................... 119/710

(58) Field of Classification Search
USPC ........................... 119/702, 707, 709, 710, 711
See application file for complete search history.

(56) References Cited

U.S. PATENT DOCUMENTS

| 5,947,061 | A  | * | 9/1999 | Markham et al. ............. 119/710 |
| 2004/0136924 | A1 | * | 7/2004 | Boyd et al. ...................... 424/48 |

* cited by examiner

*Primary Examiner* — Monica Williams
(74) *Attorney, Agent, or Firm* — Holland & Knight LLP; Richard E. Lyon, Jr.

(57) ABSTRACT

A pet toy comprising a toy body preferably in the shape of a ball, and at least one toy enhancing strip bonded to the surface of the toy body. The toy enhancing strip is edible, preferably shelf-stable and water soluble so as to be at least partially dissolvable by the pet's saliva as the toy is mouthed or chewed by the pet. The enhancing strip can comprise a breath freshener, a dental agent, a medicinal agent and/or a pet attractant. The toy body can also include a second enhancement strip bonded to the toy body to avoid masking the attractant or reducing the effectiveness of another agent.

22 Claims, 1 Drawing Sheet

THERAPEUTICALLY ENHANCED PET TOY

CROSS-REFERENCE TO RELATED APPLICATIONS

This application is a continuation-in-part of application Ser. No. 12/118,174, filed on May 9, 2008 entitled "Therapeutically Enhanced Pet Toy".

BACKGROUND OF THE INVENTION

The present invention relates to a pet toy that is particularly adapted for use by pets and carries an attracting scent and/or a breath freshening or other therapeutic agent and delivers the agent to the pet as the pet mouths and chews the toy. Problems with canine breath are well known and veterinarians and pet owners are becoming increasingly aware of the benefits of improved canine dental care. However, there is a need for an improved means of delivering the appropriate therapeutic agent or agents to the dog or other animal by the animal's owner. Breath freshening and other toy enhancing agents such as vitamins and minerals, toothpaste, mint oil, catnip oil and peanut butter have been added to pet toys in the past as a means of delivering the therapeutic agent to the animal or to increase the attractiveness of the toy to the animal. Typically, such agents are in a paste form and provided in a cavity in the toy. Other pet toys are constructed of an absorbent material and can carry the agent in a liquid form. However, the use of a toy enhancing agent in a paste form can be messy both in the application of the agent to the toy and when consumed by the animal. It will often have a very limited shelf-life and will not deliver a controlled amount of the agent to the animal which can be significant in many medicinal applications. The use of an absorbed liquid agent also provides uncontrolled delivery and shelf-life problems. The use of separate pastes, oils and the like also create packaging and shipping issues for the manufacturer, increasing the cost of the product. The present invention addresses and provides solutions to these problems.

SUMMARY OF THE INVENTION

Briefly, the present invention is directed to a pet toy comprised of a body member, such as a tennis ball, and one or more enhancing strips bonded thereto. The body of the toy preferably is configured to attract the animal. The enhancing strip(s) is formed of an edible, water soluble and preferably shelf-stable material, such as corn starch, rice starch or gum arabic, and has a breath freshening and/or other therapeutic agent or agents such as fluoride and/or sodium bicarbonate provided therein. The amount, or dosage, of the particular agent in the toy enhancing strip is readily controllable. Additionally, an attractive scent or flavoring can also be provided within the toy enhancing strip or in a second such strip to enhance the inherent attractiveness of the toy and entice the dog to play with, mouth and chew the toy. As the toy is mouthed and chewed by the animal, the animal's saliva will dissolve the strip(s), thereby delivering the desired amount of therapeutic agent(s) within the strip(s) to the animal. The strip also can be decorative so as to attract the attention of both consumers and pets.

The toy enhancing strip employed in the present invention can be applied to the toy body in a variety of ways, including, by way of example, heat transfer, the use of an edible adhesive and by direct application utilizing the water solubility of the strip. Other methods could also be employed. In a preferred application of the present invention, a tennis ball is used for the toy body and the formed strip is imprinted onto a sheet of wax paper in a desired configuration. The paper is disposed over the pet toy with the strip being pressed against the toy body. Heated air is then directed against the back side of the paper and the paper is peeled from the toy, effecting the transfer of the strip from the paper to the toy. The strip is preferably configured so as to define a pattern suggestive of the nature of the therapeutic agent carried thereby, and/or be printed with informative text regarding the toy or its features, preferably using edible ink.

DESCRIPTION OF THE PREFERRED EMBODIMENTS

Referring now in detail to the drawings, the pet toy 10 of the present invention comprises a toy body 12 and at least one toy enhancing strip 14 bonded to the surface of the toy body. The toy is particularly adapted for use by dogs, although it has applications for cats and other animals as well. In a preferred embodiment, the toy body 12 is a tennis ball, however a wide variety of body shapes and surfaces could be utilized. The toy enhancing strip 14 is edible, water soluble and preferably shelf-stable. As will be discussed, the manner of adhering the strip to the body may depend on the texture of the toy body.

Figure 1:
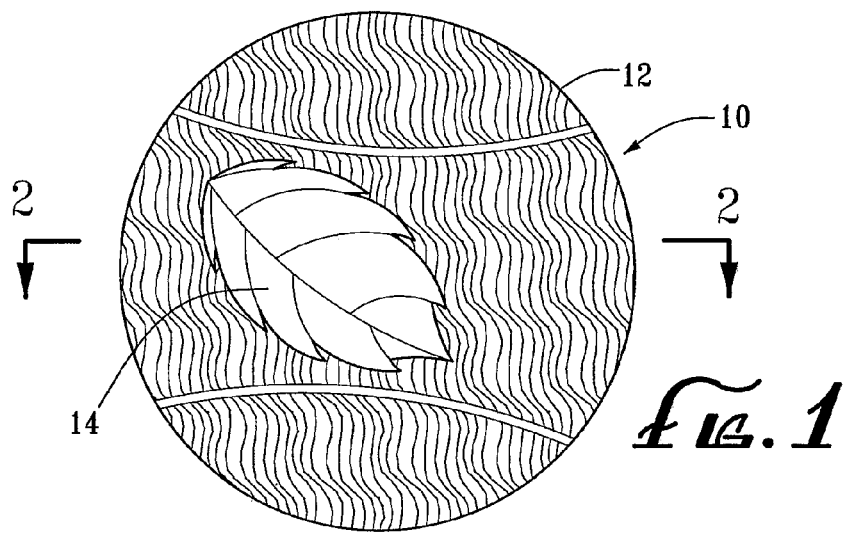
FIG. 1 is a perspective view of the pet toy of the present invention.
Figure 2:
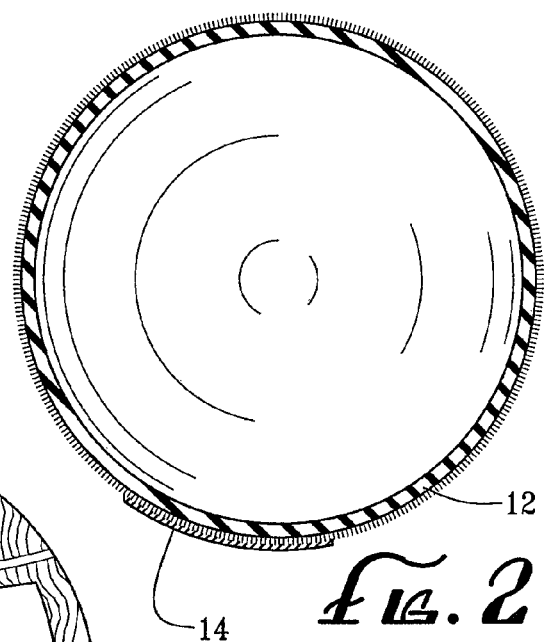
FIG. 2 is a sectional view taken along the line 2-2 of FIG. 1.

In a first embodiment of the invention illustrated in FIGS. 1 and 2, the toy body 12 is a tennis ball having the conventional felt-type tennis ball outer surface and the enhancing strip is formed of corn starch and is provided with a breath freshening agent such as a mint, e.g. spearmint, and food coloring. Strip 14 can be colored green and/or formed in the shape of a mint leaf to provide a visual identifier to the pet owner as to the nature of the enhancing strip 14. Alternatively, the strip 14 could be in the form of letters spelling out the therapeutic nature of the strip 14, e.g., "MINT." Of course, other shapes could be used, including a non-descript rectangular strip with or without printed text, colors or designs.

Strip 14 can be adhered to the outer surface of the tennis ball toy body 14 in several different ways. A preferred method when using a tennis ball for the body of the toy is to first form a liquid comprised of corn starch, food coloring and a breath freshening agent such as spearmint. The ratio of the corn starch base material to the breath freshening agent can be about 20 to 1. This ratio can be varied depending upon the particular freshening agent being used. The liquid is then imprinted onto a sheet of wax paper in the desired strip configuration. After the strip dries, the sheet of wax paper is positioned against the surface of the tennis ball such that the strip bears against the surface of the ball. Heated air is then directed against the backside of the paper while the strip is held against the ball. The heat partially melts the strip such that upon removal of the wax paper from the ball, the imprinted strip is released from the paper and adheres to the ball due to the increased area of surface contact provided by the felt surface of the ball as compared to the wax paper. The result is an edible, water soluble and shelf-stable toy enhancing strip configured in the desired identifying shape and bonded to the outer surface of the tennis ball. When the toy 10 is mouthed or chewed by a dog, the dog's saliva will dissolve the enhancing strip 14, causing the breath freshening agent to be dispersed throughout the dog's mouth, whereby a convenient and effective vehicle for the delivery of a canine breath freshener is provided.

Figure 3:
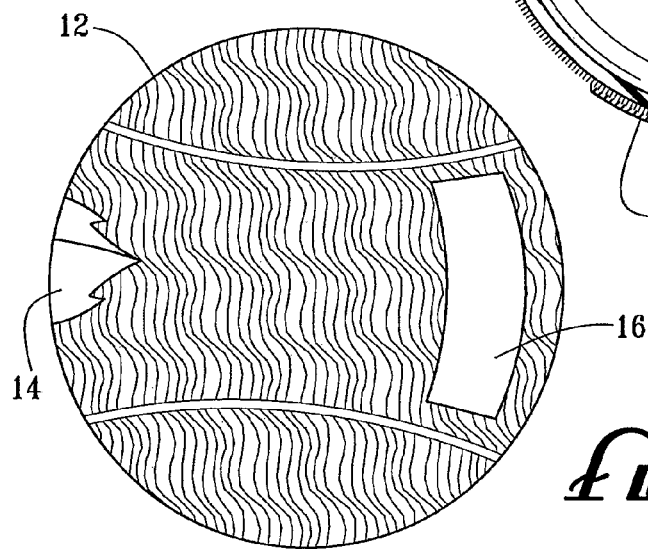
FIG. 3 is a perspective view of an alternate embodiment of the present invention.

The tennis ball configuration of toy 10 renders the toy highly attractive to a wide variety of dogs that love to chase and chew/mouth tennis balls. Accordingly, such a configuration, by itself, will often be sufficient enticement for the dog to play with, chew and mouth the ball to effect the release of the breath freshening or other therapeutic agent thereon into the dog's saliva. Many dogs, however, will not chase a ball. For such animals, a second enhancement strip 16 (see FIG. 3) can be added to the ball to provide the ball with an attractive flavoring or scent such as beef or anise. Strip 16 can be formed in the same manner as enhancing strip 14 and like strip 14, is edible and preferably has a long shelf-life. A pet toy of the present invention employing only an animal attracting strip such as strip 16 would be highly suitable for teaching a dog how to "fetch" a ball. Similarly, a toy with a single attracting strip containing catnip would be an ideal play toy for cats.

In forming pet toy 10, a wide variety of materials can be used as the base material for preparing the enhancing strip. The material, however, must be edible so as to not harm the animal, water soluble so that it can dissolve in the animal's saliva, preferably somewhat slowly to enhance the useful life and effectiveness of the strip, and the material preferably should be shelf-stable. By way of example, in addition to the aforementioned corn starch, rice starch and gum arabic, wheat starch and other vegetable or fruit starches could be employed. Xantham gum, locust bean gum (or other tree saps) could be employed. Carageenan (or other seaweed derivates), gelatin (or other animal derivatives), zinc glucanate (or other mineral derivatives), flours, sugars, corn syrup and combinations of these and other edible and shelf-stable ingredients could also be used for the base material in the formation of the strip. For the breath freshening agent, a wide variety of options would again be available. For example, in addition to mint flavorings, cinnamon, copper gluconate, clove, anise, chlorophyll, vanilla, fruit, bubble gum, peanut oil, sodium bicarbonate and celery seed oil could be employed. Further, in addition to or in lieu of a breath freshening agent, the enhancement strip could be provided with a dental care agent such as calcium or sodium fluoride to prevent decay and/or chlorhexidine to help prevent the formation of tartar and plaque, sodium bicarbonate or yucca extract to prevent bacteria growth. Medicinal agents such as glucosamine, chondroitin, ivermectin, permethrin, or other flea or heartworm medication and aspirin also could be employed in the formation of a toy enhancement strip 14. Various vitamins and minerals could be added to the base material. The amount of the agent included with the base material in the formation of the strip will depend on the nature of the agent and the amount of the agent to be delivered to the particular animal which may vary depending on the size of the animal. Also, in addition to beef and anise, a wide variety of attractive agents could be used in the formation of an enhancement strip formulated to attract the animal like strip 16. Such agents could include chicken, liver and numerous others.

In many applications, the enhancement strip can employ two or more enhancing agents. This is particularly the case when the toy body (e.g., tennis ball) provides the attractiveness for the animal and a separate scent or flavor is not required as an enhancing agent. When an animal attracting agent is also desirable, the scent of the agent could be masked by mixing the agent with a second agent in the formulation of a single strip. In such instances, separate strips should be employed. For example, if a beef or other attractive flavored scent were being employed as an attracting agent, and the enhancing agent was a breath freshener, mixing of the two agents might mask the effectiveness of the attracting agent and/or reduce the effectiveness of the breath freshening agent. In such an application, the two agents likely should be provided in separate strips.

The present invention is well suited for pet toys specifically targeted at felines as noted earlier herein. A single attracting strip containing catnip makes an ideal play toy for cats. *Nepta cataria*, also known as catnip, catswork or catmint is a strong feline attractant, both for domestic and big cats (lions, tigers, leopards, etc.) as it pleasantly and harmlessly stimulates the cat's pheromone receptors, typically resulting in temporary euphoria. The active ingredient in catnip is nepetalactone, a terpenoid. Nepetalactone can be extracted from catnip by steam distillation. Other plants that also have this effect on felines and could function as a feline attractant include valerian (*valeriana officinalis*) and plants that contain actinidine or dihydroactinidiolide. Nepetalactone, actinidine and dihydroactinidiolide, like catnip, can be provided on a toy in a single attracting strip to provide a play toy for cats or, can be employed in combination with a breath freshening agent, a dental care agent or a medicinal agent, in a single or a plurality of strips. As noted above in discussing other animal attractants, if the scent of the feline attractant would be masked by mixing the attractant with another agent or agents, the attractant preferably is provided in a separate strip.

Other methods of bonding the enhancing strip or strips onto the body of the pet toy 10 of the present invention include heat transfer applications, utilizing a heated iron as in an iron-on transfer wherein the formed strip is placed directly on the toy body, a sheet of wax paper is placed over the strip and the strip is pressed against the toy with a heated iron. Such a process again utilizes the increased surface area of a tennis ball to effect the adherence of the strip to the ball. Also, an ink formed of an edible water soluble material and food coloring and containing the desired toy enhancing agent or agents could be imprinted directly onto the body of the toy. Water could be used as a bonding agent due to the water solubility of the strip. Such an application would be particularly suitable for adhering the strip to a hard rubber pet toy. The edible and soluble liquid ink containing the toy enhancing agent could be imprinted onto a sheet of wax paper and allowed to dry. Thereafter, the surface of the toy body could be wetted with water and the strip side of the wax paper pressed against the surface of the toy. After the outer portion of the strip was partially melted by the water on the surface of the toy and allowed to dry, the wax paper could be peeled away and the strip would remain bonded to the toy body.

Because the toy enhancing strips generally will dissolve in the pet's saliva and be ingested by the animal long before the toy body is rendered unserviceable, replacement strips can be provided with toy 10 for subsequent attachment to the toy body 12 by the pet owner. Fresh replacement strips, could be readily bonded to the toy body 12 with water by the pet owner, utilizing the solubility of the strips. Other attachment methods described above also could be employed. Because of the size and nature of the toy enhancing strips, several such replacement strips could be provided with the packaged toy without impacting the overall size and weight of the toy and its packaging, thereby avoiding additional shipping costs associated with the inclusion of the toy enhancing strips.

Although the present invention has been described by way of exemplary embodiments, additional methods of bonding the enhancing strip to the toy body could also be employed as could different agents in the toy enhancing strip(s) and different toy body configurations and materials. It should be understood that many changes and substitutions may be made by those skilled in the art without departing from the spirit and the scope of the present invention, which is defined by the appended claims.

What is claimed is:

1. A pet toy for felines comprising a pet toy body and a toy enhancing strip melted and bonded to said body, said strip being edible, water soluble, and dissolvable and comprising a base material and at least one toy enhancing agent selected from the group consisting of a breath freshener, a therapeutic dental agent, a medicinal agent, and a feline attractant selected from the group consisting of nepetalactone, actinidine and dihydroactinidiolide.

2. The pet toy of claim 1 wherein said toy breath freshener is selected from the group consisting of mint, cinnamon, clove, anise, chlorophyll, copper gluconate, celery seed oil, vanilla, fruit, bubble gum, peanut oil and sodium bicarbonate.

3. The pet toy of claim 1 wherein said therapeutic dental agent is selected from the group consisting of fluoride, chlorhexidine, sodium bicarbonate and yucca extract.

4. The pet toy of claim 1 wherein said medicinal agent is selected from the group consisting of glucosamine, chondroitin, ivermectin, permethrin and aspirin.

5. The pet toy of claim 1 wherein said base material is selected from the group consisting of starches, tree saps, seaweed derivatives, animal derivatives, mineral derivatives, sugars, flours, corn syrup and combinations thereof.

6. The pet toy of claim 1 including a second toy enhancing strip bonded to said body, said second strip being edible and comprising a feline attracting agent.

7. The pet toy of claim 6 wherein said feline attractant is selected from the group consisting of nepetalactone, actinidine and dihydroactinidiolide.

8. The pet toy of claim 1 said strip is configured to provide a visual identification of the nature of said toy enhancing agent.

9. A pet toy for felines comprising a pet toy body and at least one toy enhancing strip melted and bonded to said body, said strip being edible and water soluble and comprising a base material and a feline attractant selected from the group consisting of nepetalactone, actinidine and dihydroactinidiolide.

10. The pet toy of claim 9 wherein said base material is selected from the group consisting of starches, tree saps, seaweed derivatives, mineral derivatives, sugars, flours and combinations thereof.

11. A pet toy for felines comprising a pet toy body and at least one toy enhancing strip melted and bonded to said body, said strip being edible and water soluble and comprising a base material and catnip.

12. The pet toy of claim 11 wherein said base material is selected from the group consisting of starches, tree saps, seaweed derivatives, mineral derivatives, sugars, flours and combinations thereof.

13. A pet toy for felines comprising a toy body and a toy enhancing strip melted and bonded to said body, said strip being edible, water soluble, and dissolvable and comprising a base material and at least one toy enhancing agent selected from the group consisting of a breath freshener, a therapeutic dental agent, a medicinal agent, and a feline attractant comprised of catnip.

14. The pet toy of claim 13 wherein said base material is selected from the group consisting of starches, tree saps, seaweed derivatives, mineral derivatives, sugars, flours and combinations thereof.

15. A process for forming an enhanced pet toy for felines having a pet toy body and a toy enhancing strip melted and bonded thereto, said process comprising the steps of forming an edible. water soluble, and dissolvable toy enhancing strip comprising a base material and at least one toy enhancing agent selected from the group consisting of a breath freshener, a therapeutic dental agent, a medicinal agent, and a feline attractant selected from the group consisting of nepetalactone, actinidine and dihydroactinidiolide, and bonding said strip to said toy body by a heat transfer process.

16. The process of claim 15 wherein said heat transfer process comprises the steps of depositing said strip in a liquid onto a front side of a sheet of wax paper, allowing the strip to dry, pressing the sheet of wax paper against the toy body such that the strip thereon bears against the toy body, applying heat to the rear side of said sheet of wax paper and removing the paper from the toy body.

17. The process of claim 15 wherein said heat transfer process comprises the steps of depositing said strip is a liquid form onto said toy body, allowing said strip to dry, disposing a sheet of wax paper onto the dried strip, heating the sheet of wax paper with an iron while concurrently pressing the iron against said sheet and removing the sheet from the toy body.

18. A process for forming an enhanced pet toy for felines having a pet toy body and a toy enhancing strip melted and bonded thereto, said process comprising the steps of forming an edible, water soluble, and dissolvable toy enhancing strip comprising a base material and a feline attractant selected from the group consisting of nepetalactone, actinidine and dihydroactinidiolide, and bonding said strip to said toy body by a heat transfer process.

19. The process of claim 18 wherein said heat transfer process comprises the steps of depositing said strip in a liquid form onto a front side of a sheet of wax paper, allowing the strip to dry, pressing the sheet of wax paper against the toy body such that the strip thereon bears against the toy body, applying heat to the rear side of said sheet of wax paper and removing the paper from the toy body.

20. The process of claim 18 wherein said heat transfer process comprises the steps of depositing said strip is a liquid form onto said toy body, allowing said strip to dry, disposing a sheet of wax paper onto the dried strip, heating the sheet of wax paper with an iron while concurrently pressing the iron against said sheet and removing the sheet from the toy body.

21. A process for forming an enhanced pet toy having a pet toy body and a toy enhancing strip melted and bonded thereto, said process comprising the steps of forming an edible, water soluble, and dissolvable toy enhancing strip comprising a base material, and a feline attractant selected from the group consisting of nepetalactone, actinidine and dihydroactinidiolide and bonding said strip to said toy body by a wetting and drying process comprising the steps of depositing said strip in a liquid form onto a sheet of wax paper, allowing the strip to dry, wetting the toy body, pressing the strip on said sheet against the wetting toy body, allowing the strip to partially melt and removing the sheet from the toy body.

22. A process for forming an enhanced pet toy having a pet toy body and a toy enhancing strip melted and bonded thereto, said process comprising the steps of forming an edible, water soluble, and dissolvable toy enhancing strip comprising a base material and at least one toy enhancing agent selected from the group consisting of a breath freshener, a therapeutic dental agent, a medicinal agent, and a feline attractant selected from the group consisting of nepetalactone, actinidine and dihydroactinidiolide, and bonding said strip to said toy body by a wetting and drying process comprising the steps of depositing said strip in a liquid form onto a sheet of wax paper, allowing the strip to dry, wetting the toy body, pressing the strip on said sheet against the wetting toy body, allowing the strip to partially melt and removing the sheet from the toy body.

* * * * *